United States Patent
Hill et al.

(10) Patent No.: US 12,092,885 B2
(45) Date of Patent: Sep. 17, 2024

(54) OPTICAL FIBER DISTRIBUTION SYSTEMS AND COMPONENTS

(71) Applicant: Clearfield, Inc., Minneapolis, MN (US)

(72) Inventors: John P. Hill, Oak Grove, MN (US); William Cruzen, Monticello, MN (US)

(73) Assignee: Clearfield, Inc., Minneapolis, MN (US)

( * ) Notice: Subject to any disclaimer, the term of this patent is extended or adjusted under 35 U.S.C. 154(b) by 0 days.

(21) Appl. No.: 18/308,943

(22) Filed: Apr. 28, 2023

(65) Prior Publication Data
US 2023/0266550 A1 Aug. 24, 2023

Related U.S. Application Data

(63) Continuation of application No. 17/106,632, filed on Nov. 30, 2020, now Pat. No. 11,640,034, which is a continuation of application No. 16/420,433, filed on May 23, 2019, now Pat. No. 10,852,498.

(60) Provisional application No. 62/676,046, filed on May 24, 2018.

(51) Int. Cl.
*G02B 6/44* (2006.01)
(52) U.S. Cl.
CPC ........... *G02B 6/445* (2013.01); *G02B 6/4454* (2013.01)
(58) Field of Classification Search
CPC .................................................. G02B 6/4454
See application file for complete search history.

(56) References Cited

U.S. PATENT DOCUMENTS

| | | | | |
|---|---|---|---|---|
| 6,370,309 | B1 * | 4/2002 | Daoud ................. | G02B 6/4454 385/137 |
| 7,272,291 | B2 * | 9/2007 | Bayazit ................ | G02B 6/4454 385/137 |
| 8,009,954 | B2 * | 8/2011 | Bran de Leon ...... | G02B 6/4455 385/136 |
| 8,559,784 | B2 * | 10/2013 | Ray ...................... | G02B 6/4454 385/135 |
| 9,348,105 | B2 * | 5/2016 | Rudenick ............... | G02B 6/444 |
| 11,644,631 | B2 * | 5/2023 | Hill ....................... | G02B 6/4454 385/135 |
| 2007/0047892 | A1 * | 3/2007 | Bayazit ................ | G02B 6/4454 385/135 |
| 2009/0074371 | A1 * | 3/2009 | Bayazit ................ | G02B 6/4471 385/135 |
| 2010/0183274 | A1 * | 7/2010 | Brunet ................ | G02B 6/44526 385/135 |
| 2011/0026894 | A1 * | 2/2011 | Rudenick ............... | G02B 6/445 385/137 |

* cited by examiner

*Primary Examiner* — Rhonda S Peace
(74) *Attorney, Agent, or Firm* — Troutman Pepper Hamilton Sanders LLP; Alison L. McCarthy; Mark Lehi Jones

(57) ABSTRACT

An aerial terminal for optical fiber communication comprises at least one feeder port and a plurality of distribution ports, the aerial terminal being configured to receive a fiber through the at least one feeder port and to output a plurality of fibers through the plurality of distribution ports. Embodiments may comprise stackable loose tube fiber splice chips having a plurality of lower slots and a plurality of upper slots stacked on the plurality of lower slots.

19 Claims, 21 Drawing Sheets

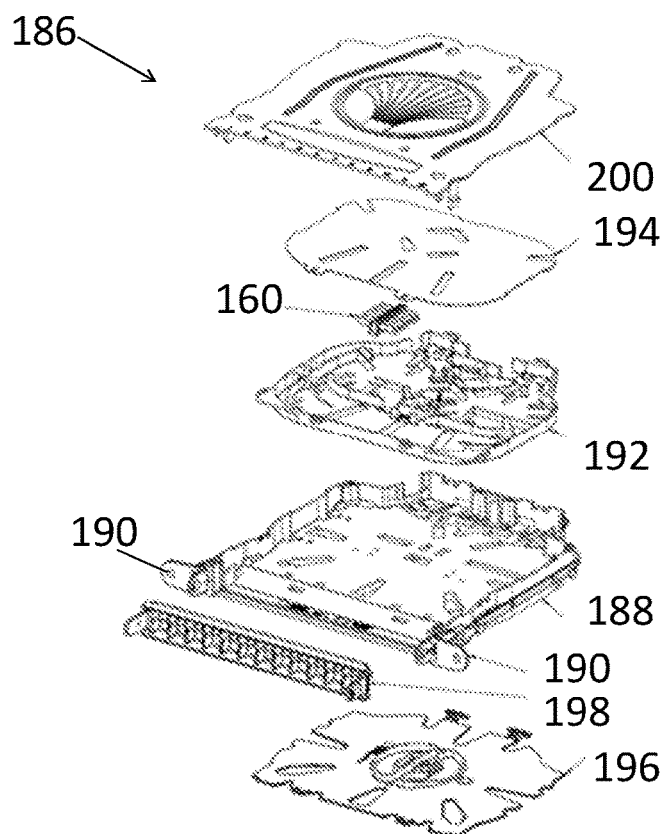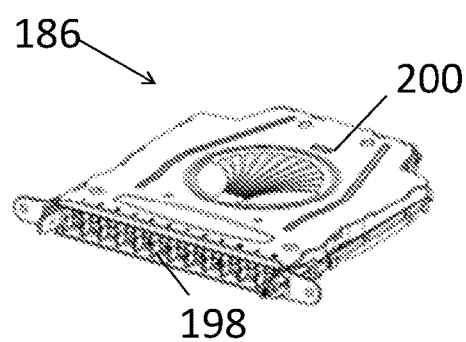
FIG. 19A
FIG. 19B

OPTICAL FIBER DISTRIBUTION SYSTEMS AND COMPONENTS

CROSS REFERENCE TO RELATED APPLICATION

This application is a continuation of U.S. patent application Ser. No. 17/106,632 filed Nov. 30, 2020, entitled, "Optical Fiber Distribution Systems and Components," which is a continuation of U.S. patent application Ser. No. 16/420,433 filed May 23, 2019 now U.S. Pat. No. 10,852, 498 issued Dec. 1, 2020, and claims the benefit of U.S. Provisional Patent Application 62/676,046, filed on May 24, 2018, the contents of both of which are incorporated herein by reference in their entirety.

TECHNICAL FIELD

The present disclosure relates generally to optical fiber distribution systems, and more specifically to aerial terminals for optical fiber communication networks.

BACKGROUND

Data, voice, and other communication networks are increasingly using fiber optics to carry information. In a fiber optic network, each individual fiber is generally connected to both a source and a destination device. Additionally, along the fiber optic run between the source and the destination, various connections or couplings may be made on the optical fiber to adjust the length of the fiber or to provide termination connection ports for end users at which one or more fibers may be branched from a feed cable. In instances when the connection may be exposed to weather conditions, an essentially waterproof configuration of components is needed.

To interconnect the cables, various cable connector designs provide for low insertion loss and stability. Some example connectors may include, but are not limited to, SC, Dual LC, LC, ST and MPO connectors. In most of these designs, ferrules (one in each connector, or one in the connector and one in the apparatus or device), each containing an optical fiber end, are butted together end to end and light travels across the junction.

With the increasing desire for completely optical networks, "fiber to the premises" (FTTP) or "fiber to the home" (FTTH) systems are being developed to provide optical fibers that extend from the source to the site of the end-user. For this purpose, optical connection terminals are needed for interconnection of the feed lines with drop cables that extend to various user locations within a certain distance from the terminals. Further, there is a need for flexible, customizable fiber distribution systems that may be easily expanded or reconfigured.

SUMMARY

According to one aspect of the present disclosure, there is provided an aerial terminal for optical fiber communication, the aerial terminal comprising at least one feeder port and a plurality of distribution ports, each distribution port comprising a flexible port having a seal, a press-in element and a clip. The aerial terminal may be configured to receive a fiber through the at least one feeder port and to output a plurality of fibers through the plurality of distribution ports. The aerial terminal may further comprise a plurality of entrance tabs, each entrance tab coupled to a respective flexible port and configured to be broken off to allow using the flexible port.

In some embodiments, the aerial terminal may further comprise at least one side panel, the at least one feeder port and the plurality of distribution ports being positioned on the at least one side panel. In some embodiments, the aerial terminal may further comprise at least one cover configured to be supported by a kickstand.

In various embodiments, each feeder port may be configured to receive multiple types of cables. Each feeder port may comprise two silicone grommets configured to be trimmed according to a size of cable to be received by that feeder port.

In some embodiments, the aerial terminal may further comprise a first compartment and a second compartment separate from the first compartment for network security. The first compartment may be configured to receive fiber from the at least one feeder port and the second compartment may be configured to provide fiber to the plurality of distribution ports.

In some embodiments, the aerial terminal may further comprise a side panel having a first portion and a second portion configured to couple to the first portion to form the side panel, the first portion including the at least one feeder port coupled to the first compartment, and the second portion including the plurality of distribution ports coupled to the second compartment.

In some embodiments, the aerial terminal may further comprise a first cover configured to enclose the first compartment and further configured to be supported by a first kickstand in an open position, and a second cover configured to enclose the second compartment and further configured to be supported by a second kickstand in an open position.

In some embodiments, the first compartment may comprise at least one adapter plate and a plurality of drop management rings, and the second compartment may comprise at least one splice tray. In some embodiments, the second compartment may be configured to receive three splice trays. In some embodiments, the splice tray may include a stackable loose tube fiber splice chip. The splice chip may comprise a plurality of slots configured to receive fiber splices. The plurality of slots may comprise a plurality of lower slots and a plurality of upper slots stacked on the plurality of lower slots.

According to another aspect, there is provided a splice chip comprising a base, a plurality of lower protrusions emanating from the base, a plurality of upper protrusions emanating from the base, a plurality of lower slots formed between the plurality of lower protrusions, and a plurality of upper slots formed between the plurality of upper protrusions, the plurality of upper slots being stacked on the plurality of lower slots.

In some embodiments of the splice chip, the base may be an elongated base further comprising a plurality of posts. The plurality of lower protrusions and the plurality of upper protrusions may emanate from the plurality of posts. In some embodiments, the splice chip may further comprise a plurality of chip ends configured to couple the splice chip to a splice tray.

According to another aspect, there is provided a fiber management device comprising a base having a slack fiber storage area, an adapter tray configured to couple to the base, and a splice tray configured to receive a stackable loose tube fiber splice chip, the loose tube fiber splice chip comprising a plurality of lower slots and a plurality of upper slots stacked on the plurality of lower slots. In some embodiments, the splice tray may be further configured to receive a ribbon splice chip. In some embodiments, the splice tray may be configured to receive at least two stackable loose tube fiber splice chips, each loose tube fiber splice chip being configured to receive 12 loose tube splices. The plurality of lower slots may be configured to receive a first plurality of 6 loose tube splices and the plurality of upper slots may be configured to receive a second plurality of 6 loose tube splices.

BRIEF DESCRIPTION OF THE FIGURES

FIG. 19A is an exploded perspective view of an optical fiber cassette having a loose tube fiber splice chip configured according to aspects of the present disclosure;

FIG. 19B is a perspective view of the optical fiber cassette of FIG. 19A;

DETAILED DESCRIPTION

Aspects of the present disclosure provide aerial optical fiber terminals and components that are flexible and customizable. Terminals may be configured differently and customized according to service provider and customer needs.

When the network deployment plan calls out for an aerial application, embodiments of the aerial terminals disclosed herein allow for the flexibility to terminate a feeder fiber, directly into revenue generating drops and have the capability to accommodate a fiber cable mid-span, allowing cables to be fully utilized while feeding multiple terminals and access points.

Various embodiments disclosed herein allow for aerial or strand mount fiber deployment within the network architecture. Various embodiments may accept the "hand-off" of fiber and distribute multiple individual service drops (for example, 24 service drops) and may have the capability to mid-span a larger count fiber cable, allowing the service provider to deploy multiple terminal/access points along the same cable run, maximizing the investment in fiber deployment.

Designed for easy, craft accessibility, various embodiments may provide an upward hinging, kickstand supported cover with multiple side entrance cable access ports. For example, one embodiment may provide four side entrance cable access ports. In various embodiments, two individual compartments may separate the incoming splices from the drop ports for network security. In some embodiments, the backplane of the unit may have the capacity to hold up to three splice trays, incorporating fiber management and bend-radius protection into the design. Each splice tray may support, for example, 24 loose tube or 72 ribbon splices. With up to 24 individual drops terminated to SC or LC connectors, various embodiments may accept many types of drop cables.

The present disclosure is not limited in terms of the particular embodiments described in this application, which are intended as illustrations of various aspects. Many modifications and variations can be made without departing from its spirit and scope, as will be apparent to those skilled in the art.

Figure 1:
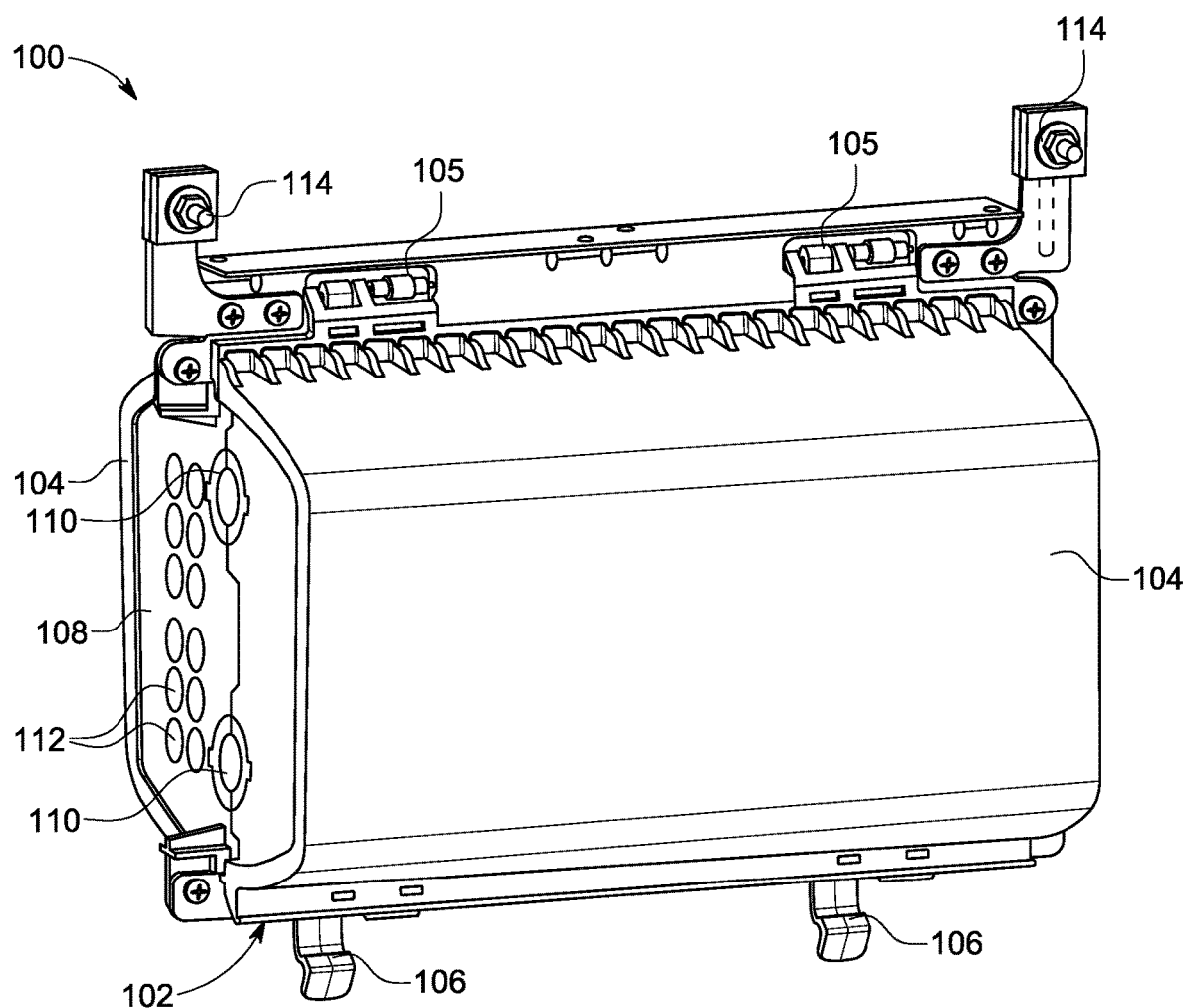
FIG. 1 is a perspective view of one embodiment of an aerial terminal configured according to aspects of the present disclosure.

FIG. 1 is a perspective view of one embodiment of an aerial terminal 100. The terminal 100 includes a housing 102 and two covers 104 on either side of the terminal. The covers 104 may be coupled to the housing 102 by hinges 105 and may be locked by latching locks 106. Embodiments are not limited to hinges and latching locks. In other embodiments, other types of coupling and locking mechanisms may be used. The latches may include bolts or other locks, clips or seals, or other locking mechanisms may be used. In some embodiments, the covers may be a removable hinged covers. The housing 102 of the aerial terminal 100 includes side panels 108 on opposite sides of the housing. Each side panel 108 may include a plurality of ports, including feeder ports 110 and distribution ports 112, discussed in further detail below.

Figure 2:
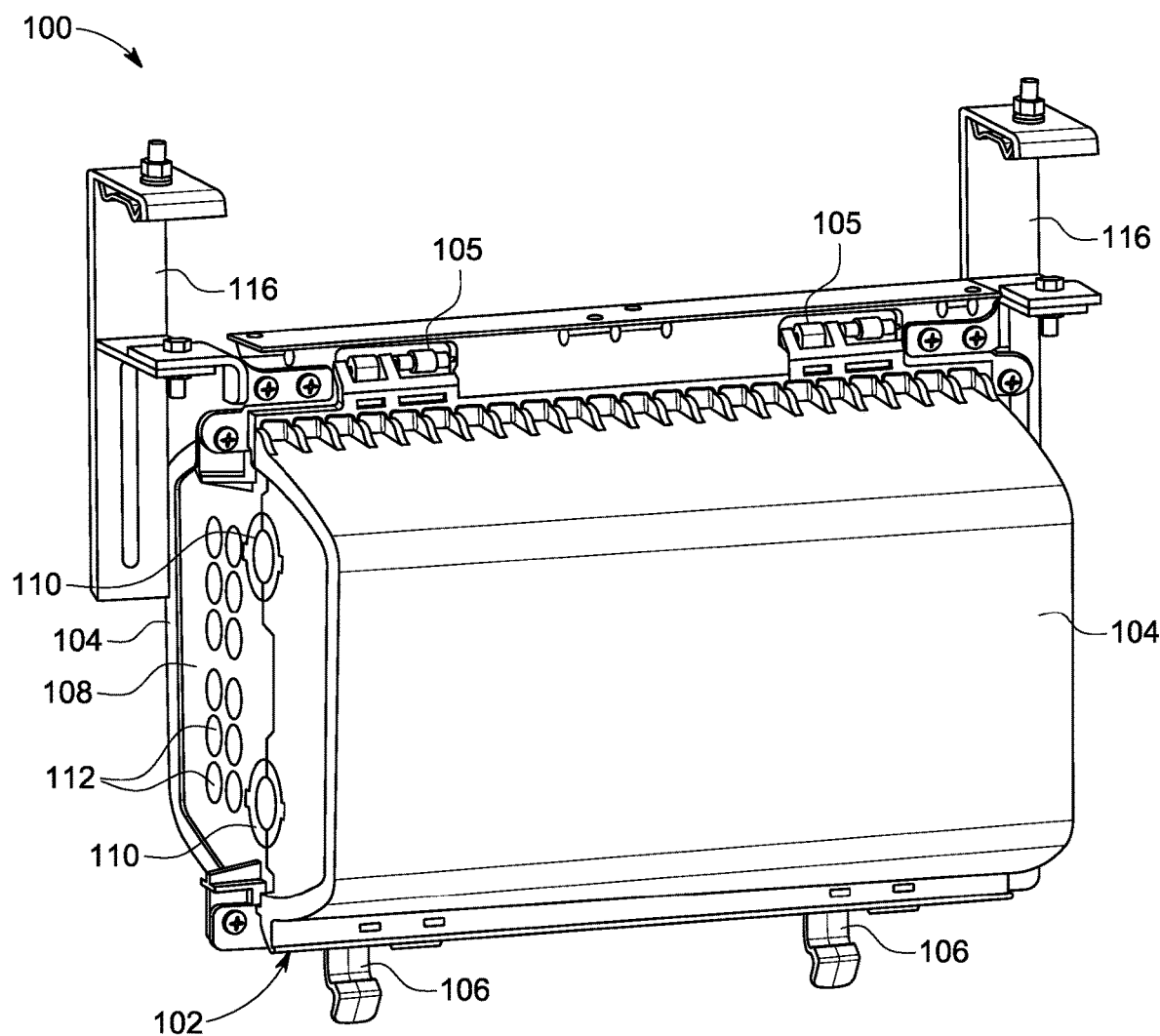
FIG. 2 is a perspective view of the aerial terminal of FIG. 1 with a different mounting structure according to aspects of the present disclosure.

The terminal 100 may also include a mounting bracket 114 for mounting the terminal to a strand. FIG. 2 is a perspective view of the aerial terminal 100 with a different mounting bracket 116 for mounting the terminal to a strand. Embodiments are not limited to the mounting brackets illustrated herein. In other embodiments, yet other types of mounting structures may be used.

Figure 3A:
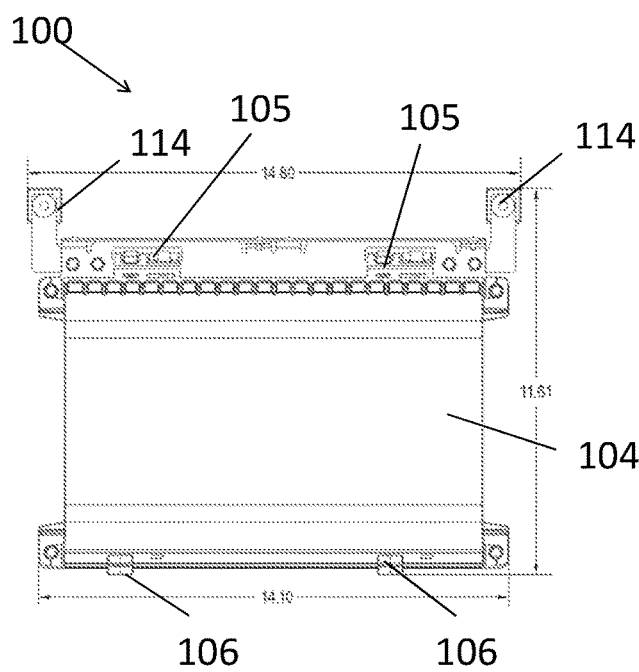
FIG. 3A is a front view of the aerial terminal of FIG. 1 according to aspects of the present disclosure.
Figure 3B:
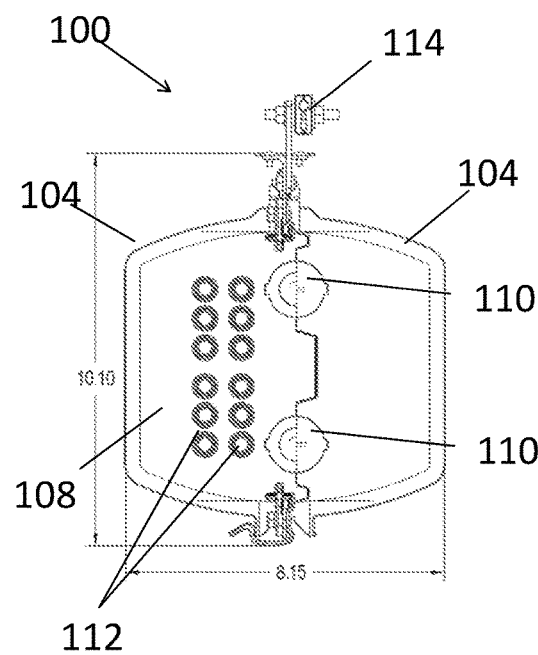
FIG. 3B is a side view of the aerial terminal of FIG. 1 according to aspects of the present disclosure.

FIG. 3A is a front view of the aerial terminal 100, showing the cover 104 on one side of the terminal. FIG. 3A shows exemplary dimensions of the terminal. In this example, the terminal 100 has dimensions of about 14.8 inches by about 11.6 inches. In other embodiments, the terminals may have different sizes, and may be shaped differently than those illustrated herein. FIG. 3B is a side view of the aerial terminal 100, showing that it has a depth of about 8.15 inches. In other embodiments, the terminal may have a different depth, and may be shaped differently than those illustrated herein. For example, in some embodiments, the terminal may have dimensions that are substantially smaller than the 14.8 inches width, the 11.6 inches height and the 8.15 inches depth.

FIG. 3B shows both covers 104 on the sides of the terminal, and one side panel 108. The side panel 108 has a plurality of feeder ports 110 and a plurality of distribution ports 112. The two feeder ports 110 are shown to be larger than the distribution ports 112. In one example, each feeder port 110 may be about 14 mm sealed duct port. Each feeder port 110 may have a breakoff cap. In some embodiments, feeder ports 110 may have anti-rotation locking features. The 12 smaller ports are distribution ports 112. Each distribution port 112 may be about 10 mm sealed duct port. Each distribution port 112 may have a breakoff cap. In some embodiments, the distribution ports 112 may have anti-rotation locking features. The distribution ports 112 may be Clearfield FlexPorts. Although this embodiment shows two feeder ports 110 and 12 distribution ports 112, other embodiments may include a different number of each type of port. The ports 110 and the ports 112 may be sealed. The ports 110 and 112 may include knock-out covers that can be removed once a port 110 and 112 is used. The ports may also be arranged in a different configuration than the embodiment shown in FIG. 3B.

Figure 4:
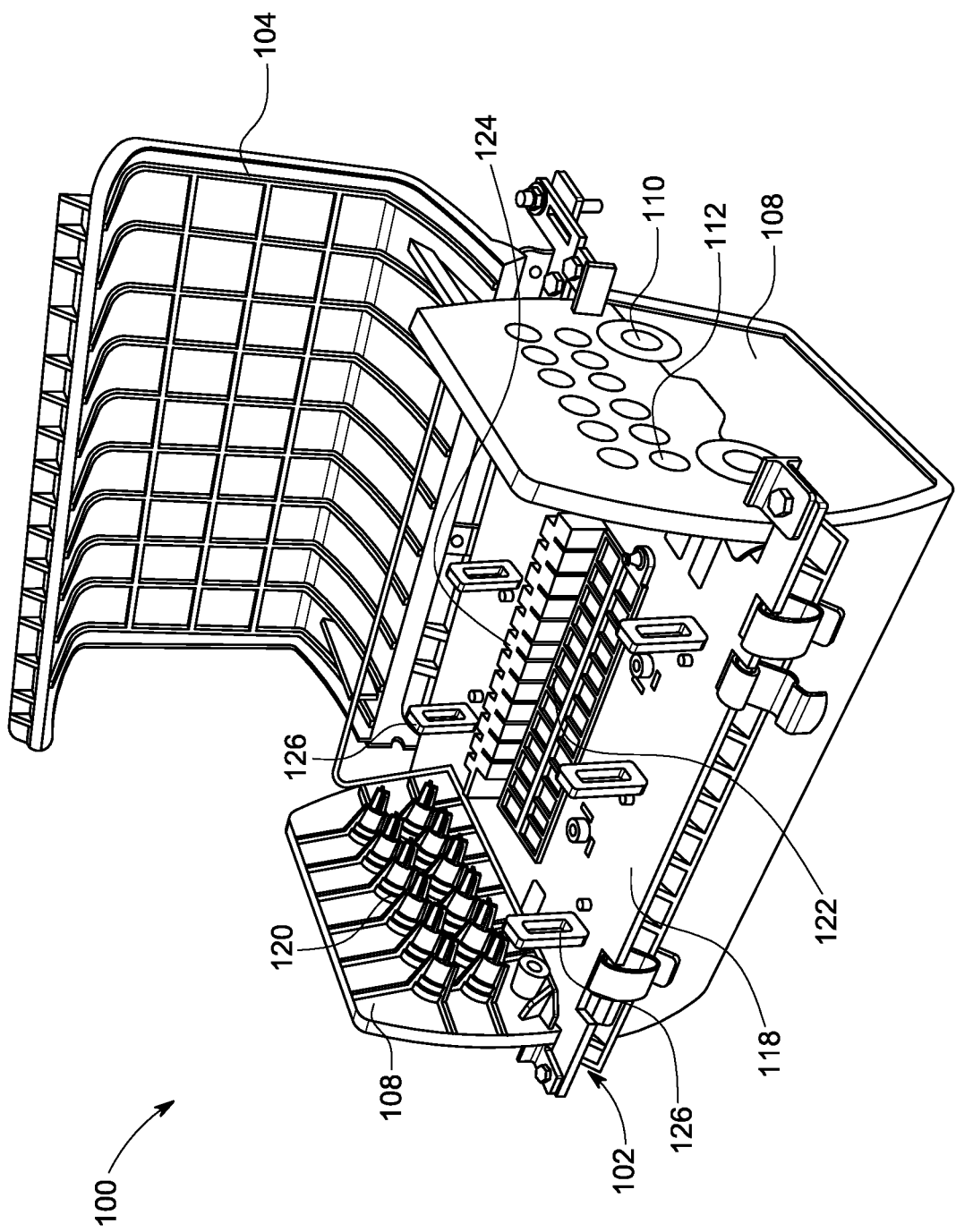
FIG. 4 is a perspective view of the aerial terminal of FIG. 1 that has been opened on one side according to aspects of the present disclosure.

FIG. 4 is a perspective view of the aerial terminal 100 with one of the covers 104 being open, revealing a compartment 118 positioned on one side of the terminal. As shown in FIG. 4, each distribution port 112 has a respective entrance tab 120 inside the compartment 118. The entrance tabs 120 must be broken off to use the respective ports 112. The compartment 118 further includes at least one adapter plate 122. The adapter plate 122 includes a plurality of adapters 124. The adapters 124 may correspond to the distribution ports 112. The adapter plates 122 may be arranged in a plurality of rows. In one embodiment, a first row comprising a first adapter plate may correspond to the distribution ports on a first side panel of the terminal, and a second row comprising a second adapter plate may correspond to distribution ports on a second side panel of the terminal. The compartment 118 further includes drop management rings 126.

Figure 5:
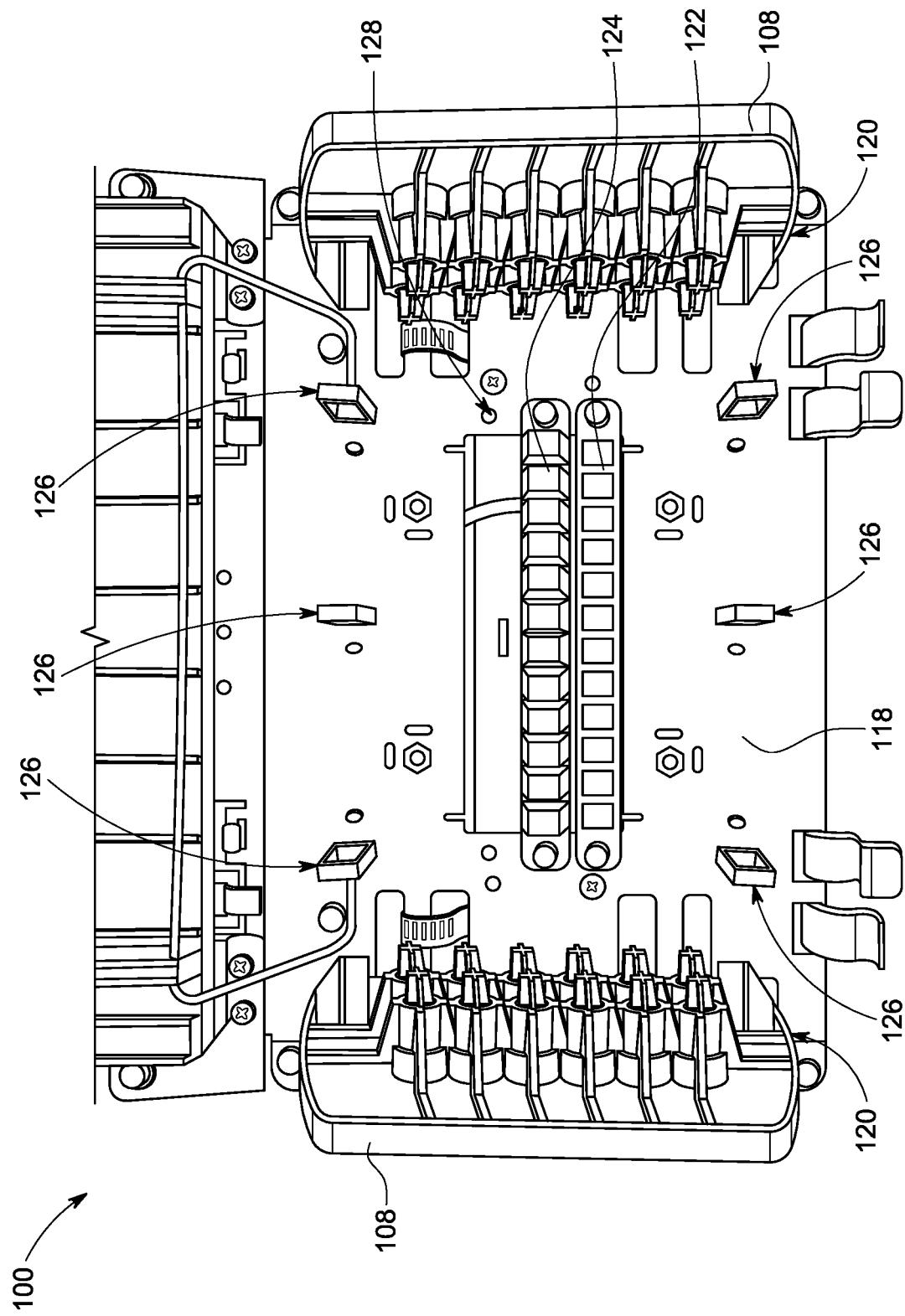
FIG. 5 is a perspective view of a first compartment of the aerial terminal of FIG. 1 according to aspects of the present disclosure.

FIG. 5 is a perspective view of a first compartment 118 of the aerial terminal 100, showing entrance tabs 120 of the distribution ports 112 on the interior side of the side panels 108 of the terminal. In this embodiment, there are 12 entrance tabs corresponding to the 12 distribution ports on each side of the terminal. Different embodiments may have a different number of ports and corresponding entrance tabs. The compartment 118 includes six drop management rings 126. Other embodiments may comprise a different number of drop management rings. Three rows 128 are configured to receive adapter plates 122. The top row is empty and configured for insertion of an adapter plate. The middle row is shown to include an adapter plate having a plurality of adapters 124. The bottom row is shown to include an adapter plate 122. Each adapter plate 122 in this embodiment includes 12 adapter slots, each slot corresponding to a respective distribution port 112. Other embodiments may comprise a different number of ports and adapters.

Figure 6:
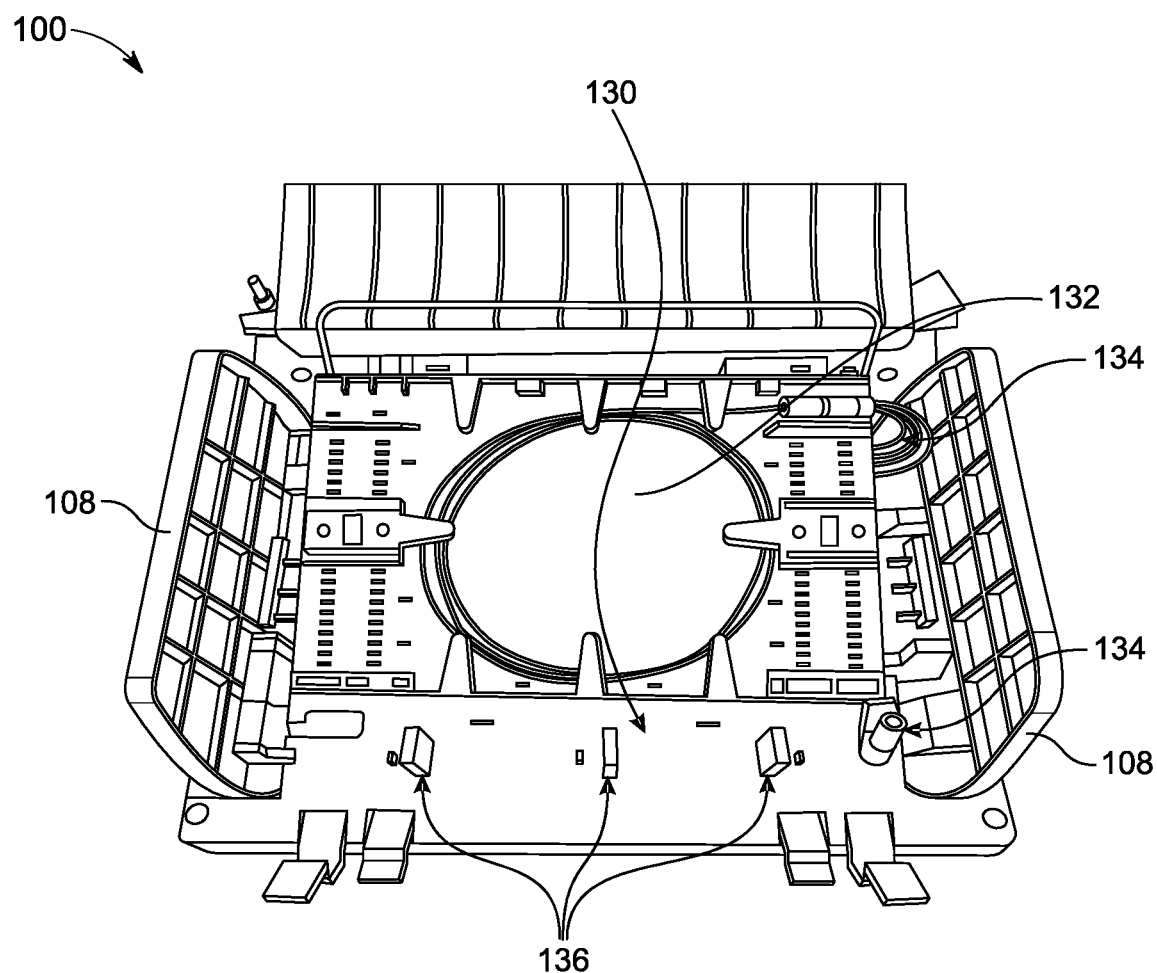
FIG. 6 is a perspective view of a second compartment of the aerial terminal of FIG. 1 according to aspects of the present disclosure.

FIG. 6 is a perspective view of a second compartment 130 of the aerial terminal 100. The second compartment 130 is the backplane of the terminal 100 and is configured to hold at least one fiber splice tray 132. In one embodiment, the second compartment 130 may be configured to hold up to three splice trays 132. Each splice tray 132 may have capacity for up to 24 loose tube or 72 ribbon fiber splices. In some embodiments, the terminal 100 may include a module or cassette having splice and fiber management area. The cassette may be configured to terminate the fiber that runs into the terminal 100. Various embodiments may include different types or configurations of cassettes.

The second compartment 130 receives feeder fiber through the feeder ports 110 shown for example in FIG. 4. The terminal 100 can, for example, include four feeder ports 110, two on each side of the terminal. The feeder ports 110 may be configured to accept multiple cable types. For example, each port 110 may accept up to 144 fiber count or a flat drop feed. Each feeder port 110 may be a 14 mm sealed duct port with a breakoff cap and anti-rotation locking feature. Referring to FIG. 6, the second compartment 130 includes cable attachment brackets 134. Each feeder port 110 may have a corresponding cable attachment bracket 134 disposed within the second compartment 130.

The second compartment 130 further comprises fiber management spools and rings 136. In various embodiments, the second compartment may provide slack storage capacity. In one embodiment, the terminal may have internal slack storage capacity of about 12 feet of loose tube and about 12 feet of ribbon cable.

The terminal 100 is configured to allow termination of a feeder fiber and can accommodate a fiber mid-span. The terminal 100 may allow cables to be utilized while feeding multiple terminals and access points in a distribution system. The terminal 100 may be constructed and arranged to accept fiber and distribute multiple individual service drops. The terminal 100 may allow for mid-span for a larger count fiber cable. A service provider using the terminal 100 may deploy multiple terminals 100 along the same cable run. The terminal 100 may accept FieldShield drop options and other cable drop options.

In various embodiments, separation of the second compartment 130 as shown in FIG. 6 from the first compartment as shown in FIG. 5 allows for separation of the splices in the second compartment from the drop ports in the first compartment, thereby enhancing network security.

Figure 7B:
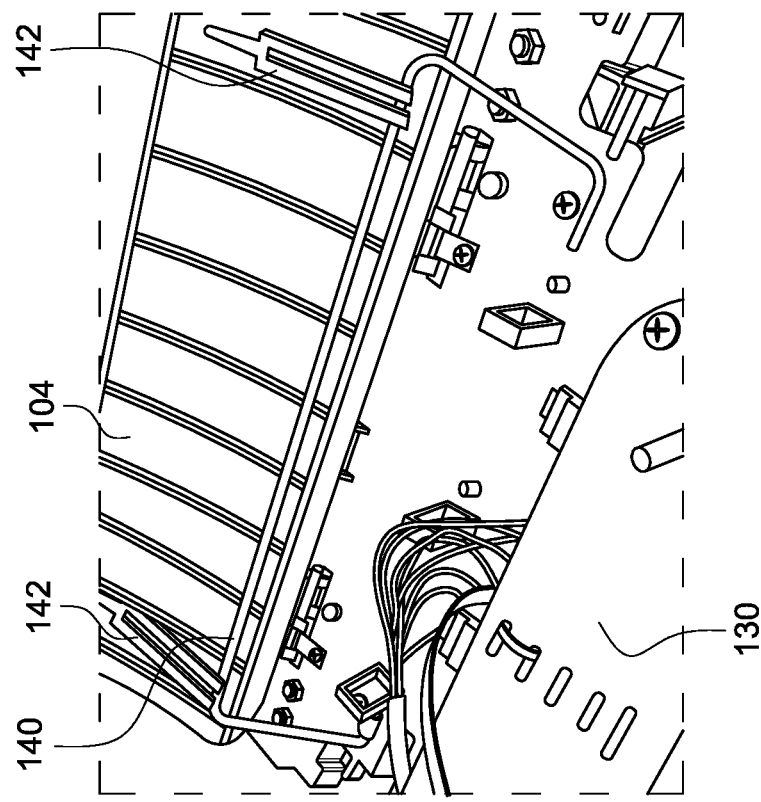
FIG. 7B is a perspective view of a kickstand supporting the cover of the second compartment of the aerial terminal of FIG. 1 according to aspects of the present disclosure.
Figure 7A:
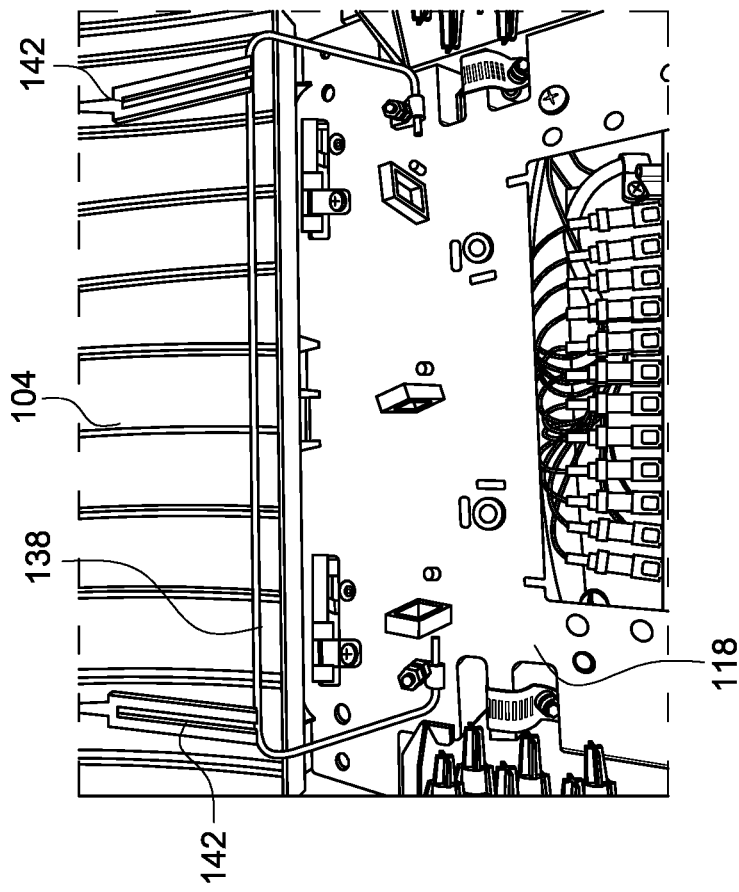
FIG. 7A is a perspective view of a kickstand supporting the cover of the first compartment of the aerial terminal of FIG. 1 according to aspects of the present disclosure.

In various embodiments, the cover 104 of each compartment may be held up by a respective kickstand. FIG. 7A is a perspective view of a kickstand 138 supporting the respective cover 104 of the first compartment 118 of the aerial terminal 100. FIG. 7B is a perspective view of a kickstand 140 supporting the respective cover 104 of the second compartment 130 of the aerial terminal 100. The kickstands 138 and 140 may be hinged and coupled to the interior of the terminal 100. Each cover 104 may include one or more tabs 142 for engaging the respective kickstand 138 or 140 to hold the cover in an open position, thereby allowing convenient access to the interior of the terminal 100.

Figure 8:
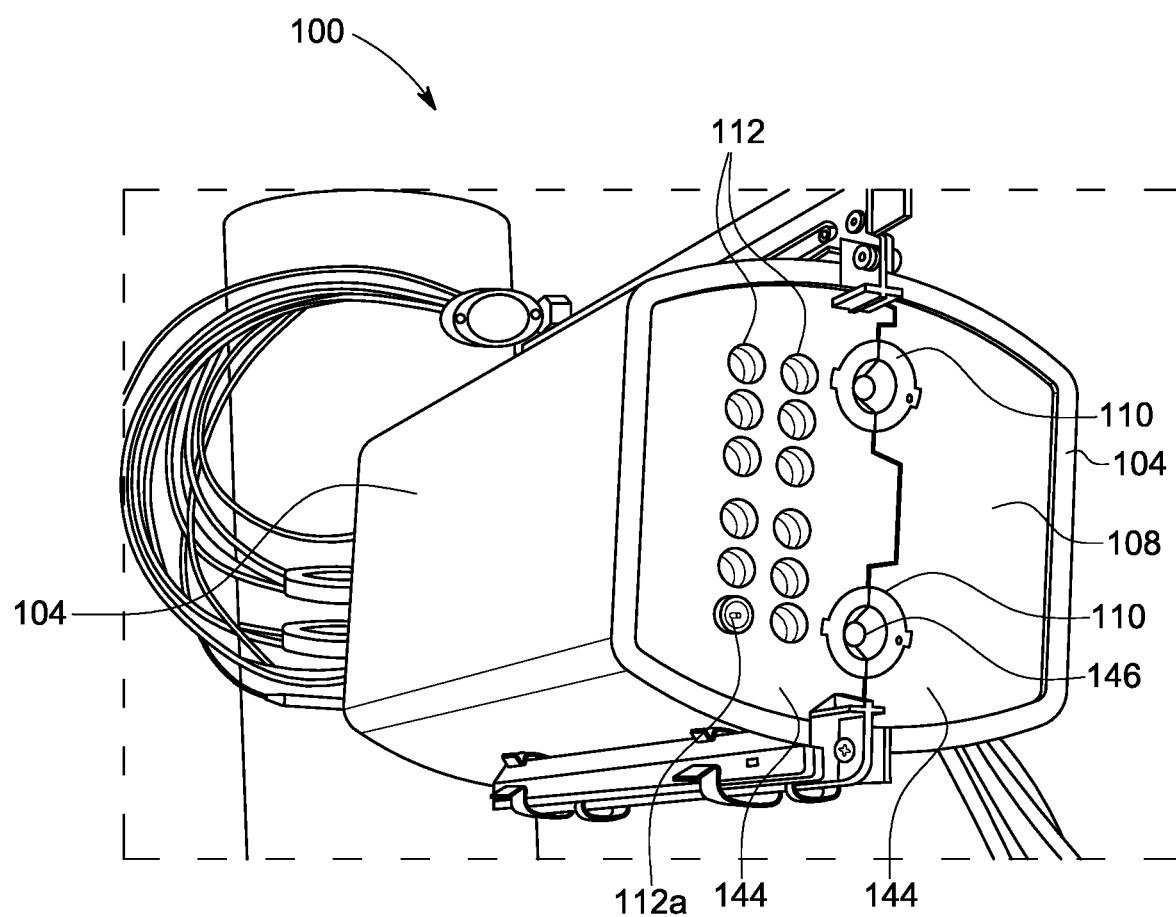
FIG. 8 is a perspective view of the aerial terminal of FIG. 1, showing ports of the terminal configured according to aspects of the present disclosure.
Figure 9:
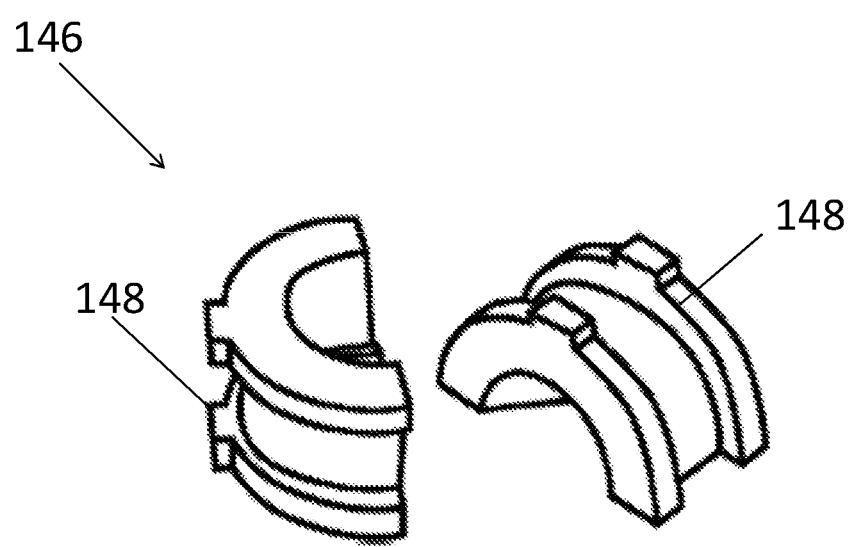
FIG. 9 is a perspective view of two half silicone grommets according to aspects of the present disclosure.

FIG. 8 is a perspective view of the aerial terminal 100, showing the feeder ports 110 and the distribution ports 112 on the side panel 108 of the terminal. The side panel 108 of the terminal may comprise two end plates 144. The feeder ports 110 may be centered on the side panel 108 such that each end plate 144 comprises half of each feeder port. When the end plates 144 are abutted, the feeder ports 110 are formed therebetween. In other embodiments, the feeder ports may be aligned or arranged differently than shown in FIG. 8. As shown in FIG. 8, each of the feeder ports 110 may be sealed with a silicone grommet 146. Each silicone grommet 146 may comprise two half silicone grommet pieces 148, as shown in FIG. 9. Separation of the silicone grommets 146 into two pieces 148 allows for trimming and customizing the grommets to fit any size of cable to be received into the feeder ports.

Figure 10:
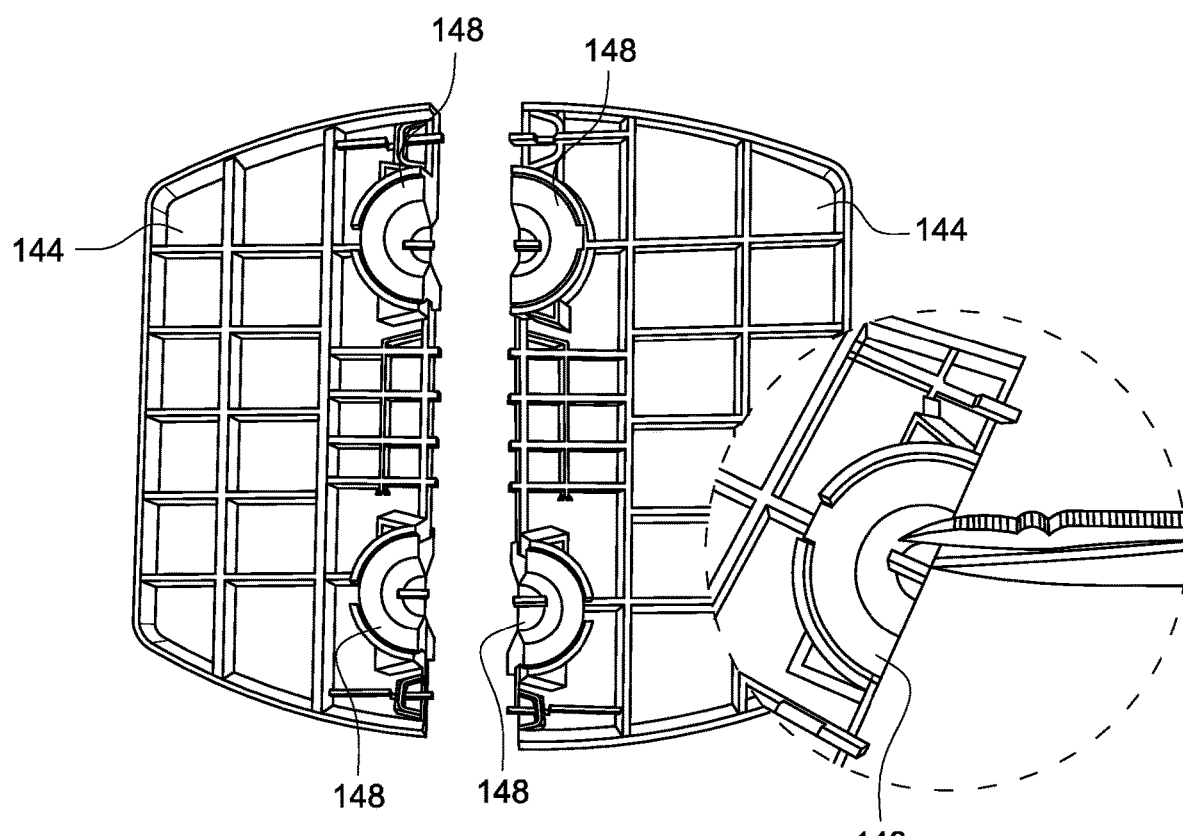
FIG. 10 is a perspective view of two end plates and four half grommets to be trimmed according to aspects of the present disclosure.

FIG. 10 is a perspective view of two end plates 144. Four half grommets 148 are positioned in the end plates 144. Separation of the end plates 144 allows for easily trimming the compression grommets 148 by clipping out the silicone for each cable entrance needed as shown in FIG. 10, to fit the cable being utilized in that feeder port. Thus, each feeder port may be customized to match a respective type and size of cable.

Figure 11:
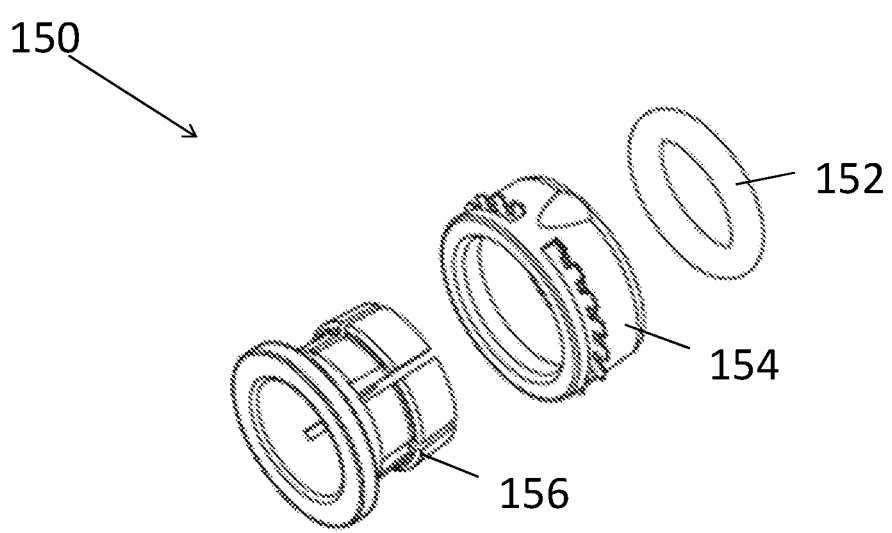
FIG. 11 is a perspective view of one embodiment of a flexible port (FlexPort) according to aspects of the present disclosure.

Referring again to FIG. 8, the plurality of distribution ports 112 may be configured to be sealed ports. In one embodiment, each port 112 may be sealed by installing a flexible port (Clearfield FlexPort) therein, as shown in FIG. 8 by the sealed port 112a. FIG. 11 is a perspective view of one embodiment of a flexible port 150 (FlexPort). The flexible port 150 comprises a seal, such as an O-Ring 152, a press-in element 154 and a clip 156. In some embodiments, a flexible port 150 may be pre-installed within the distribution ports 112 of the terminal 100. In other embodiments, a flexible port 150 may be installed in the field. A flexible port 150 may be installed by placing the seal or O-ring 152 into the desired port hole, placing the press-in element 154 into the hole, and installing the clip 156 into the press-in element.

Figure 12A:
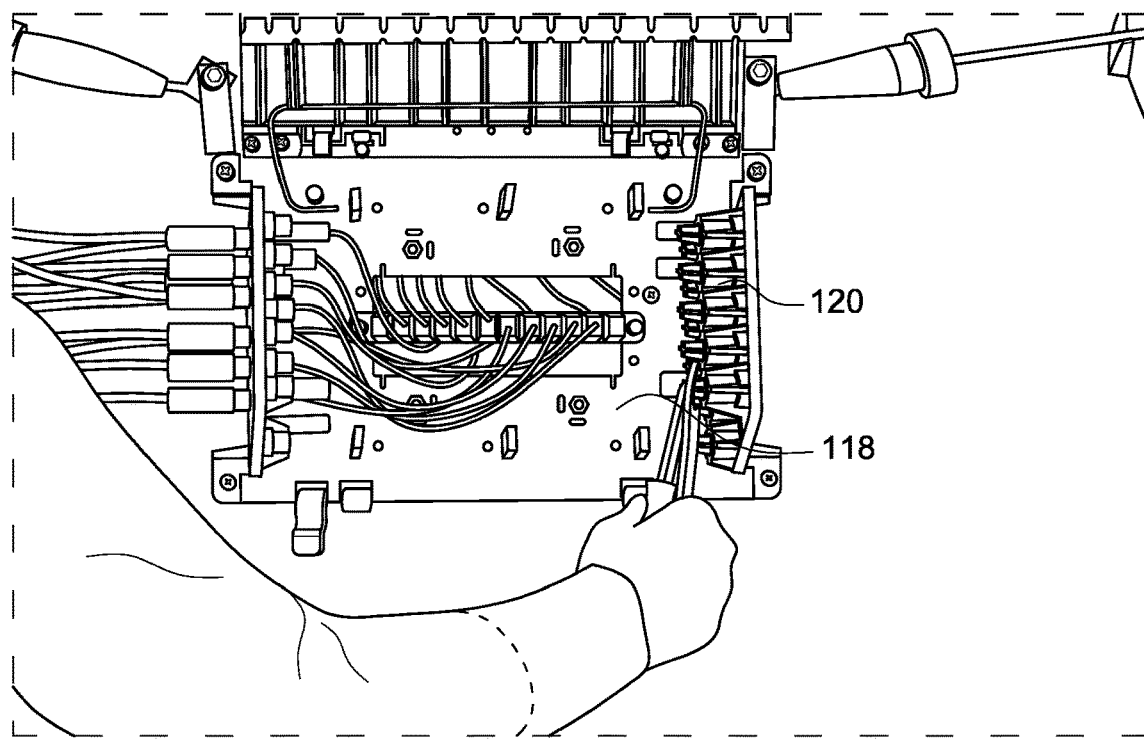
FIGS. 12A and 12B show the entrance tabs of flexible ports being broken off prior to usage of the flexible ports according to aspects of the present disclosure.
Figure 12B:
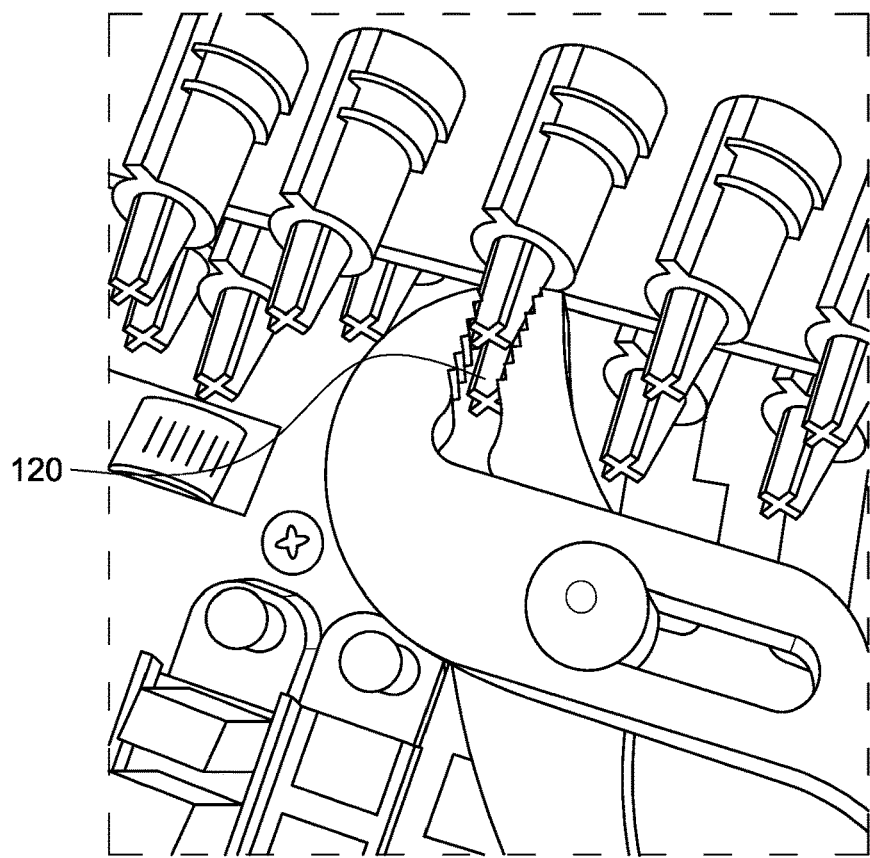

The flexible ports 150 may further comprise entrance tabs 120 as shown in FIGS. 12A and 12B. The entrance tabs 120 are disposed inside the first compartment 118. As shown in FIGS. 12A and 12B, the entrance tabs 120 of flexible ports 150 are being broken off prior to usage of the flexible ports.

Figure 13:
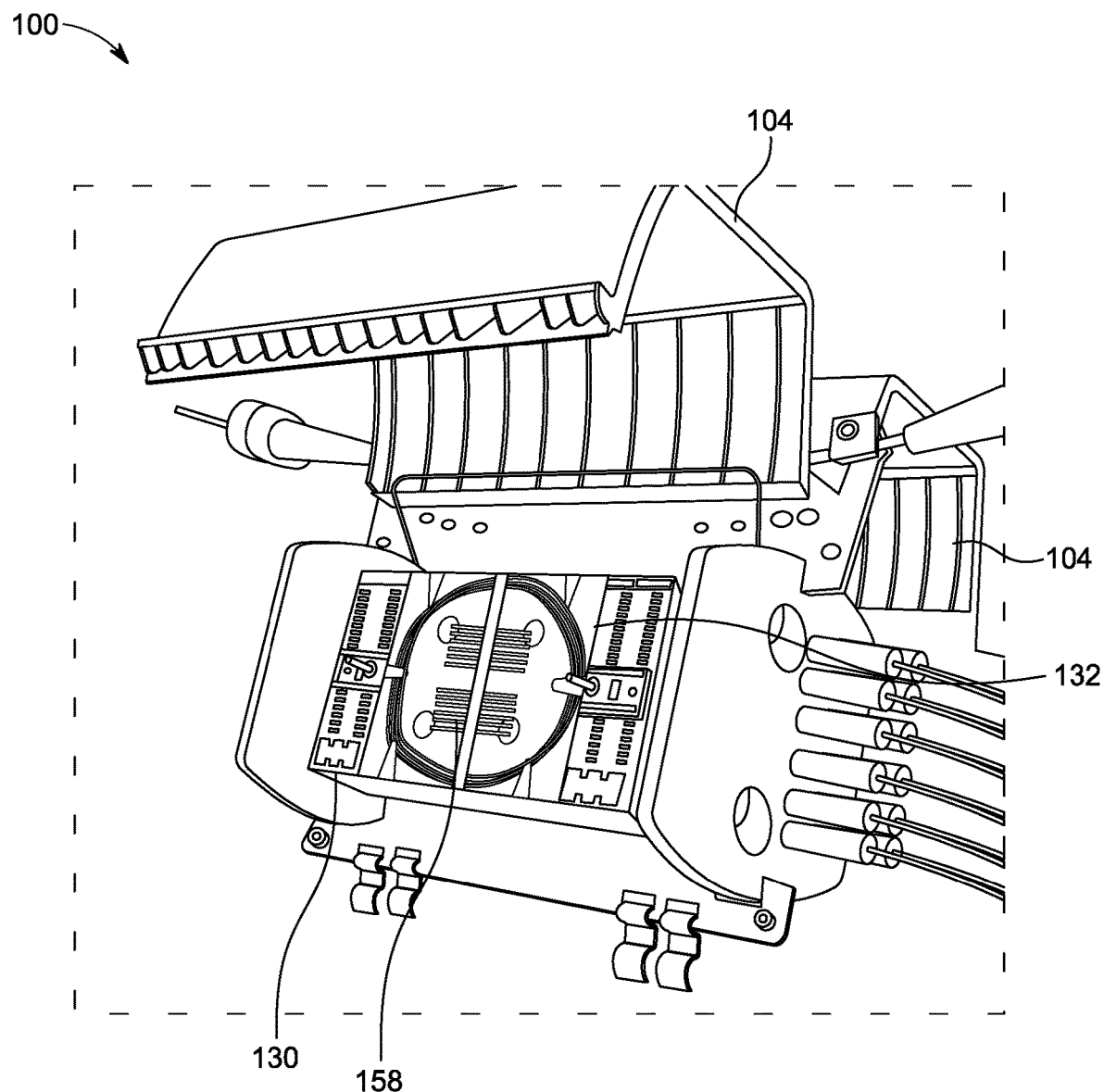
FIG. 13 is perspective view of the aerial terminal of FIG. 1 with both covers open, showing a splice tray configured according to aspects of the present disclosure.

FIG. 13 is perspective view of the aerial terminal 100 with both covers 104 open. The second compartment 130 of the terminal includes a splice tray 132 having a translucent cover 158. In various embodiments disclosed herein, the splice trays may include stackable loose tube fiber splice chips, as discussed below in relation to FIGS. 14A to 14C.

Figure 14A:
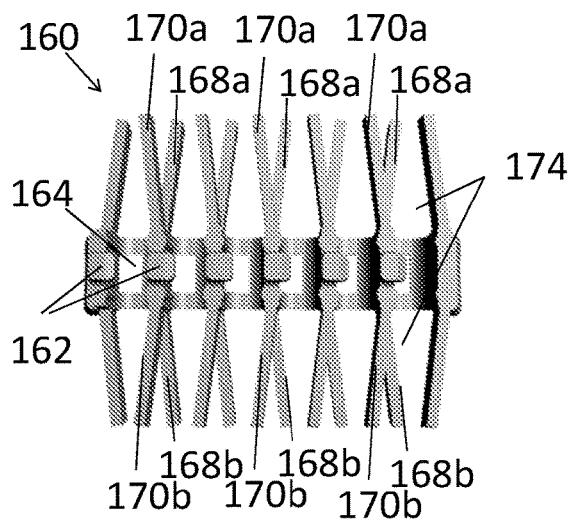
FIG. 14A is a top view of one embodiment of a splice chip configured according to aspects of the present disclosure.
Figure 14B:
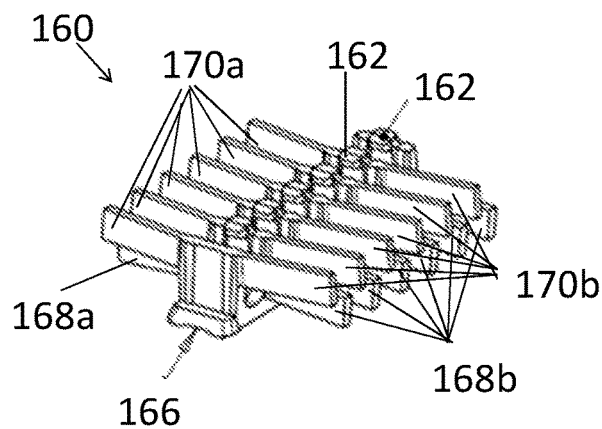
FIG. 14B is a perspective view of the splice chip of FIG. 14A.
Figure 14C:
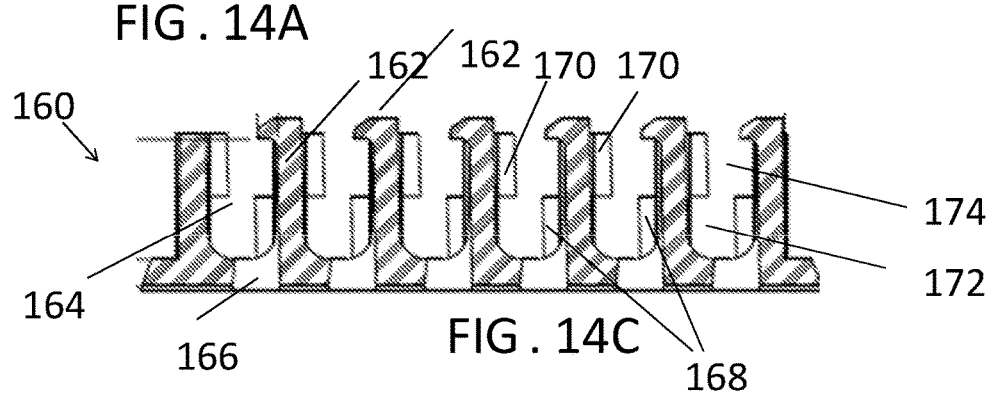
FIG. 14C is a cross-sectional side view of the splice chip of FIG. 14A.

FIG. 14A is a top view of one embodiment of a splice chip 160, FIG. 14B is a perspective view of the splice chip 160, and FIG. 14C is a cross-sectional side view of the splice chip 160. Referring now to FIGS. 14A to 14C, the splice chip 160 includes a plurality of central posts 162 spaced apart from each other. For example, the central posts 162 may be spaced apart equidistantly from each other, forming a plurality of slots 164, each slot located between a pair of posts. As shown in FIGS. 14B and 14C, the plurality of posts 162 may be arranged vertically along an elongated base 166.

Each post 162 has a plurality of protrusions emanating therefrom, on either side of the base 166. The protrusions may comprise lower protrusions 168 that emanate from a lower portion of the posts 162, and upper protrusions 170 that emanate from upper portions of the posts 162, as shown for example in FIG. 14C. Thus, the lower protrusions 168 and the upper protrusions 170 divide each slot 164 into two stacked slots comprising a lower slot 172 and an upper slot 174. The lower protrusions 168 and the upper protrusions 170 may be angled relative to each other as shown for example in FIGS. 14A and 14B, and may form stacked elongated slots 172 and 174 for storing loose tube fiber splices. All the lower protrusions 168a on a first side (side a) of the base 166 may be oriented substantially parallel to each other, and all the upper protrusions 170a on the first side of the base may be oriented substantially parallel to each other. Further, all the lower protrusions 168b on a second side (side b) of the base 166 may be oriented substantially parallel to each other, and all the upper protrusions 170b on the second side of the base may be oriented substantially parallel to each other. In one embodiment, the lower protrusions 168a on one side of the base 166 may be oriented substantially parallel to the upper protrusions 170b on the other side of the base. Similarly, the upper protrusions 170a on one side of the base 166 may be oriented substantially parallel to the lower protrusions 168b on the other side of the base, so as to form an "X" pattern of protrusions 168 and 170 emanating from a plurality of posts 162.

As shown in FIGS. 14A to 14C, the splice chip 160 has six elongated upper slots 174. The splice chip 160 also has six elongated lower slots 172. Each of the lower slots 172 is located under a corresponding upper slot 174. Thus, each splice chip 160 holds 12 loose tube fiber splices: six splices stacked on top of six splices.

Figure 15:
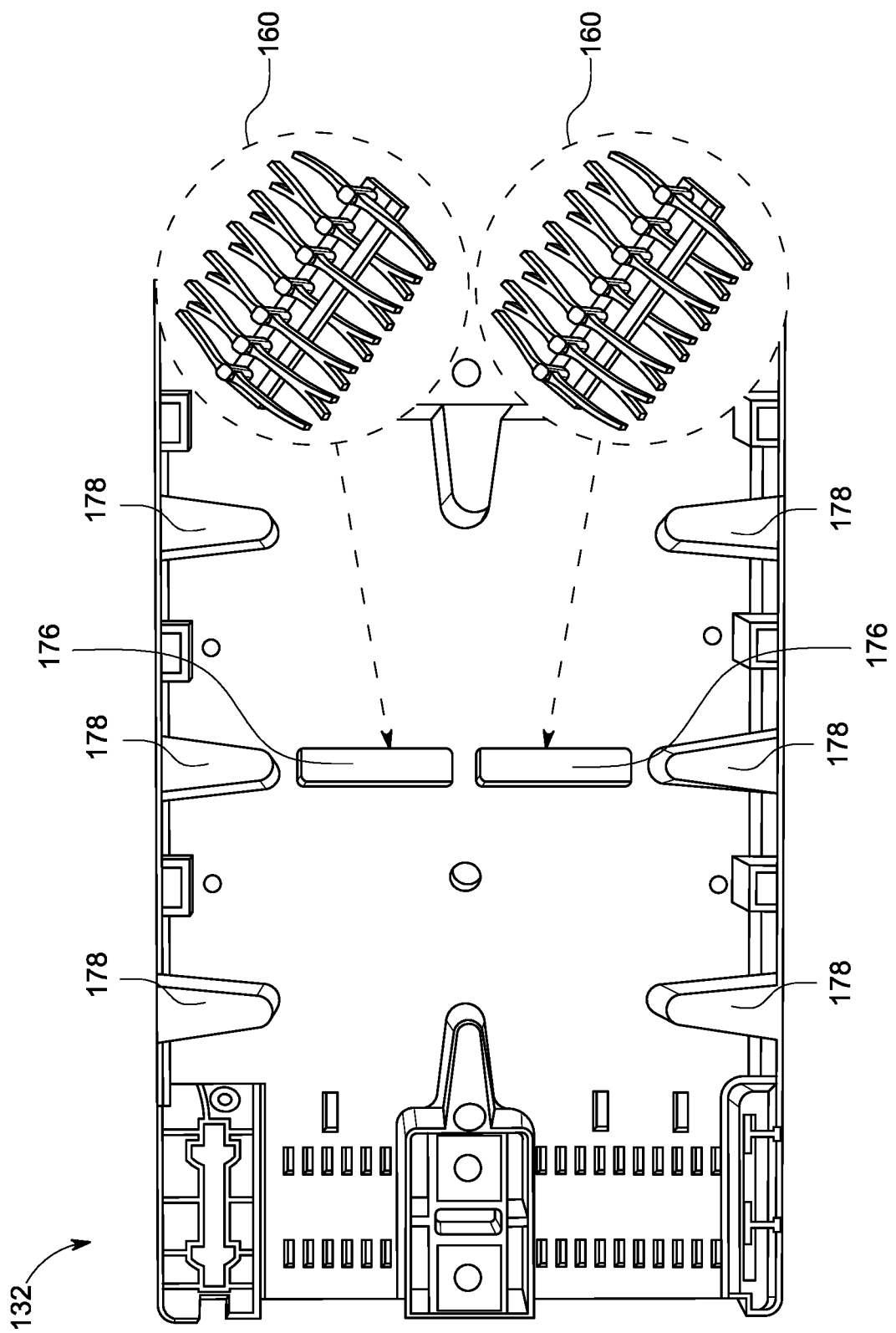
FIG. 15 is a top view of a splice tray for receiving splice chips configured according to aspects of the present disclosure.

FIG. 15 is a top view of the splice tray 132 configured to receive a plurality of splice chips 160. In this embodiment, the splice tray 132 is configured to receive two splice chips 160. Other embodiments may be configured to receive a different number and arrangement of splice chips. The splice tray 132 includes a plurality of slots 176, each slot 176 being configured to receive a respective splice chip 160. For example, a slot 176 may be configured to couple to at least portion of the base 166 of a splice chip 160. Other embodiments of splice trays and splice chips may comprise a different mechanism for coupling. The splice tray 132 further comprises a plurality of prongs 178 for fiber management and storage.

Figure 16:
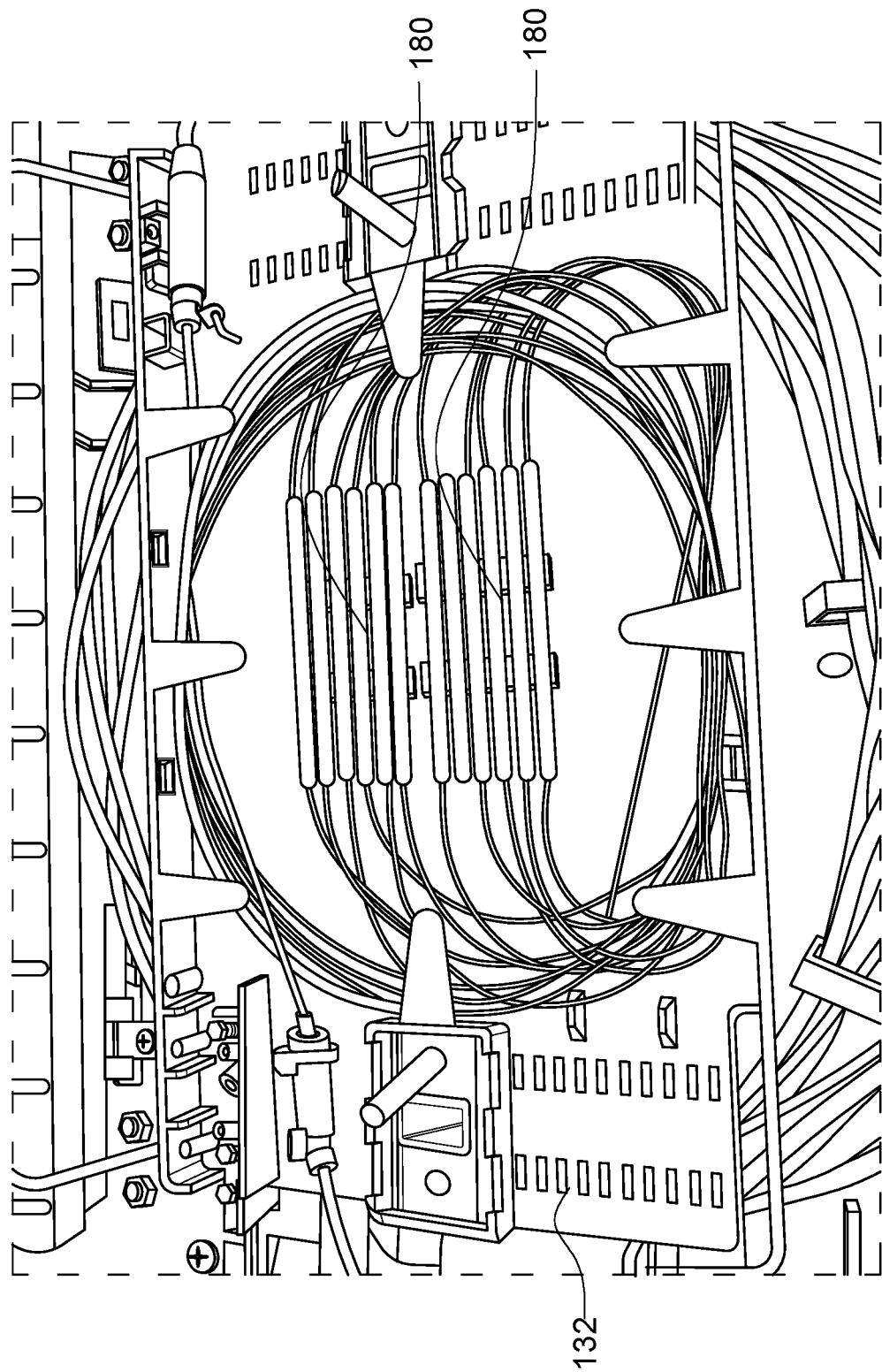
FIG. 16 is a perspective view of a splice tray with splices disposed in two splice chips according to aspects of the present disclosure.
Figure 17:
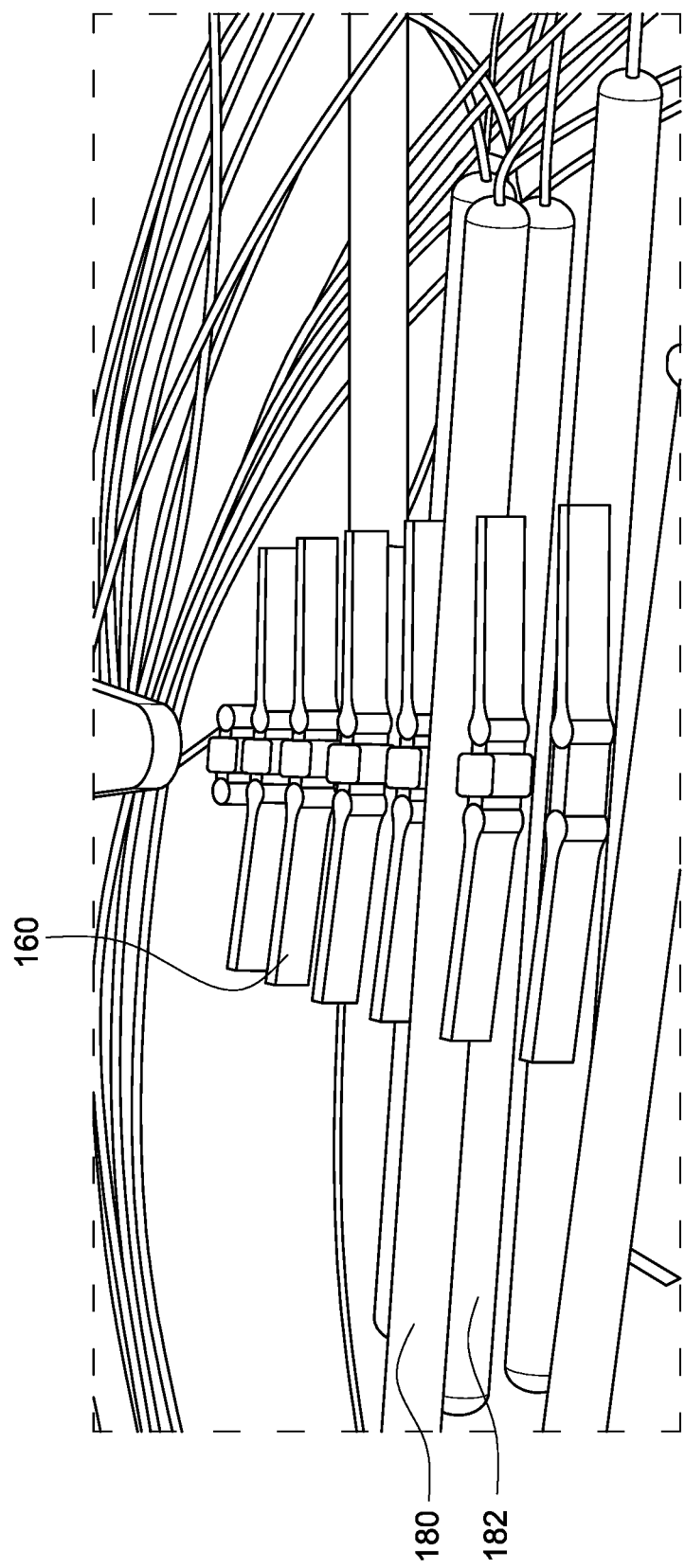
FIG. 17 is a close-up view of a splice chip of FIG. 16, showing stacked loose tube fiber splices disposed therein according to aspects of the present disclosure.

FIG. 16 is a perspective view of the splice tray 132 with splices 180 disposed in the two splice chips 160. Each splice chip 160 is shown to store splices 180 in the six slots of the splice chip. FIG. 17 is a close-up view of a splice chip 160, showing splices 180 and 182 stored in the top and bottom rows or slots of the splice chip, respectively. Thus, the splice chip 160 accommodates stacked loose tube fiber splices 180 and 182, up to a maximum of 12 splices.

Figure 18:
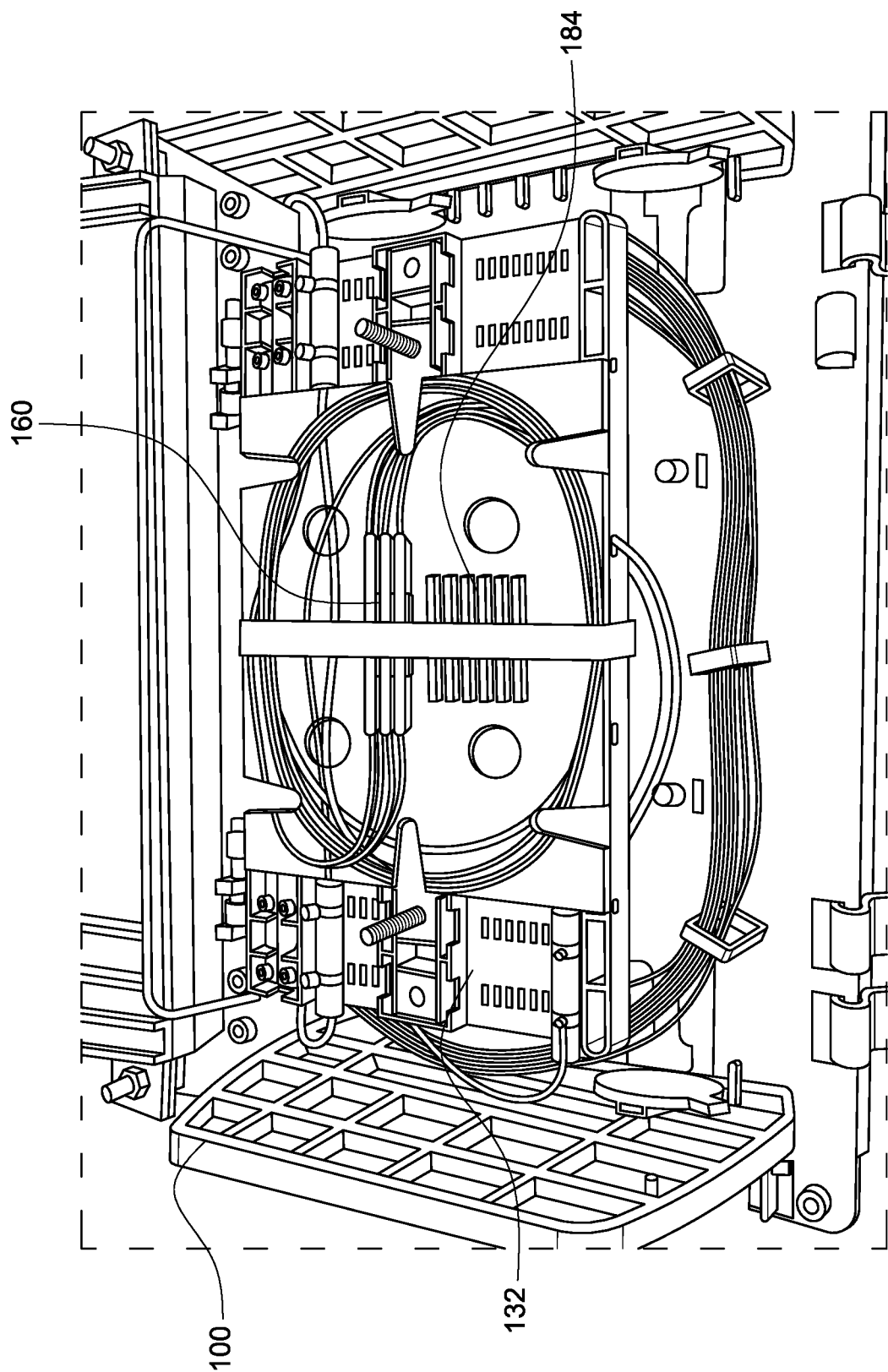
FIG. 18 is a perspective view of a splice tray having a stackable loose tube fiber splice chip and a ribbon splice chip according to aspects of the present disclosure.

FIG. 18 is a perspective view of a splice tray 132 within the terminal 100, having one stackable loose tube fiber splice chip 160 and one ribbon splice chip 184. Some embodiments of splice trays may comprise loose tube fiber splice chips that may accommodate up to 24 loose tube fiber splices per tray. Other embodiments of splice trays may comprise ribbon splice chips that may accommodate up to 72 ribbon splices per tray. In yet other embodiments, the splice tray may comprise various combinations of loose tube fiber splice and ribbon splice chips.

Some embodiments of the aerial terminals disclosed herein may comprise fiber management modules or cassettes. Various embodiments of fiber management cassettes may comprise stackable loose tube fiber splice chips such as the splice chip 160 illustrated in FIGS. 14A to 14C. FIG. 19A is an exploded perspective view of one embodiment of an optical fiber cassette 186 having a loose tube fiber splice chip 160. The cassette 186 comprises a base 188 having mounting tabs 190. The cassette 186 further comprises a splice tray 192 and a splice tray cover 194 configured to couple to the splice tray. The splice tray is configured to receive at least one splice chip 160. The base 188 comprises a slack storage area and is configured to couple to a slack storage cover 196. The cassette 186 further comprises an adapter plate 198 and a top cover 200 configured to couple to the base 188. FIG. 19B is a perspective view of the assembled optical fiber cassette 186, showing the adapter plate 198 positioned at the front of the cassette and the top cover 200 positioned at the top of the cassette.

Figure 20A:
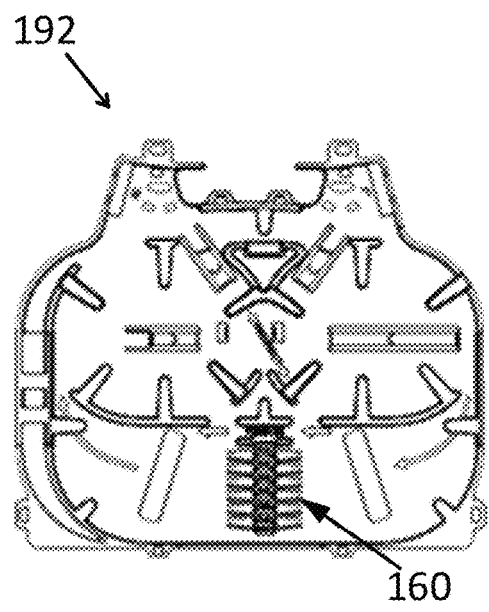
FIG. 20A is a top view of the splice tray of the optical fiber cassette of FIG. 19A having a single splice chip according to aspects of the present disclosure.
Figure 20B:
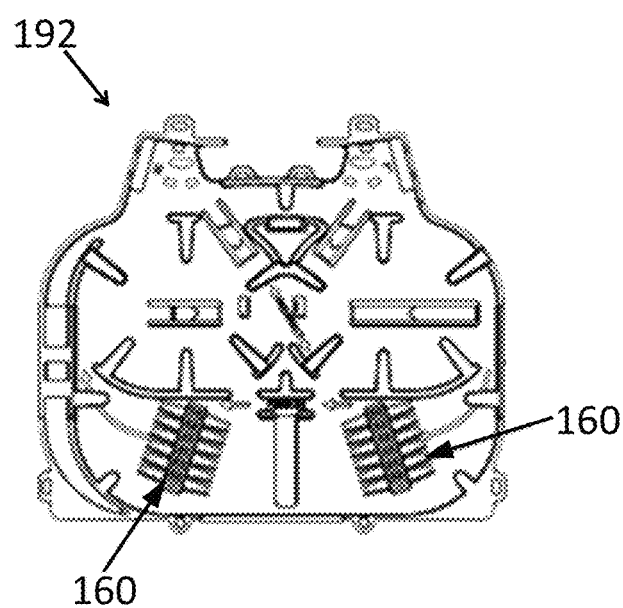
FIG. 20B is a top view of the splice tray of the optical fiber cassette of FIG. 19A having two splice chips according to aspects of the present disclosure.

FIG. 20A is a top view of the splice tray 192 of the optical fiber cassette 186. The splice tray 192 includes a single splice chip 160. The splice tray 192 may also accommodate two splice chips 160, as shown for example in FIG. 20B. Other embodiments of splice trays and cassettes may accommodate a different number or arrangement of splice chips. The splice tray further comprises a fiber routing and management area.

Figure 21A:
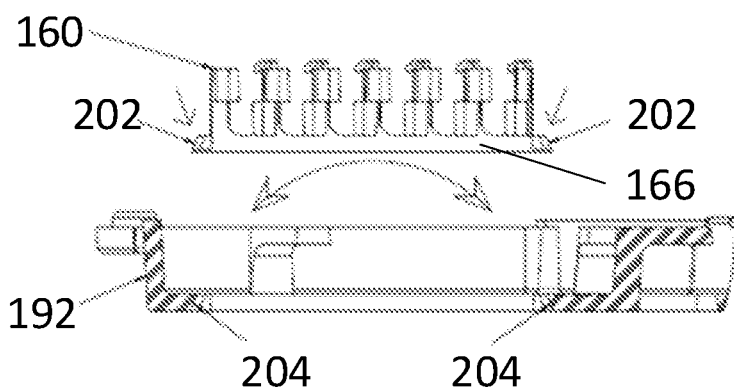
FIG. 21A is a side view of a portion of a splice tray configured for receiving a splice chip according to aspects of the present disclosure.
Figure 21B:
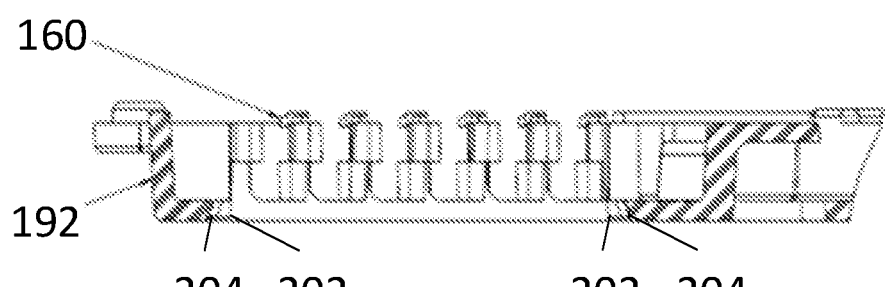
FIG. 21B is a side view of the splice tray of FIG. 21A with the splice chip inserted therein according to aspects of the present disclosure.

FIG. 21A is a side view of a portion of the splice tray 192 configured for receiving a splice chip 160. The splice chip 160 includes a plurality of chip ends 202 at the edges of the base 166 of the splice chip. The splice tray 192 includes a plurality of undercuts 204 configured to receive the plurality of chip ends 202 so as to couple the splice chip 160 to the splice tray. The chip ends 202 may be bent down as shown by the arrows and may be inserted below the undercuts 204 in the splice tray 192. FIG. 21B shows the splice chip 160 inserted into the splice tray 192, with the chip ends 202 positioned below the undercuts 204 of the splice tray. In other embodiments, different mechanisms may be used to couple the splice chips to the splice tray.

Embodiments of terminals disclosed herein, such as terminal 100, may be used in optical fiber distribution systems. For example, a feeder port of terminal 100 may be configured to receive a feeder cable having a plurality of fibers into the terminal. The terminal may be configured to allow connecting the fibers to a cassette, module or adapters within the terminal. Drop cables may be supplied to user locations through one or more distribution ports. Various user locations may be equipped with tap boxes configured to receive one or more fibers and to connect them to the user locations.

Various embodiments of terminals disclosed herein may be indexed, also referred to as daisy chained, so as to provide drop cables at successive locations along a route. For example, a single fiber may be output at a terminal, with the remaining fibers being propagated and input to the next terminal, and so on, until no active fibers remain.

Terminals disclosed herein improve the customer application and craft experience by providing an access terminal capable of multiple drops, for example 24 drops and multiple feeder ports, for example four feeder ports, using a modular and flexible approach that scales across the application environment.

Various embodiments of terminals disclosed herein are made of black UV resistant thermoplastic designed to resist corrosion. Environmentally sealed terminals provide maximum reliability and durability in the harshest OSP environments. Flat-SC drop connectors may provide bend-limiting relief protection and watertight seal for flat drop, OSP and other types of cable.

In some embodiments, the terminal may be configured to accept up to 24 10 mm distribution ports (for example, for 10 mm FieldShield Microduct or FieldShield Flat-SC). In some embodiments, the terminal may accept up to four 14 mm feeder ports (for example, for 14 mm Field Shield Microduct). Patch and splice configurations may accept both flat drop and OSP cable types. Flexibility in configuration provides maximum scalability across multiple services classes. In some embodiments, field-assembled Field Shield Pushable drop cables reduce installation time and labor costs by removing expensive splicing labor from the terminal to customer premise. Pre-terminated factory polished feeder and drop cables improve network operability across multiple network access points.

Terminals disclosed herein may be configured to provide various types of connectors, for example SC/APC, SC/UPC, LC/APC and LC/UPC for the distribution and feeder ports. Terminals are not restricted to proprietary connectors.

According to another aspect disclosed herein, terminals may be configured in a patch and splice configuration. Whether distribution cables are passing through a serving area, fiber is being handed off via a mid-span and continuing on, or current architecture is being upgraded to push fiber further into the network with FTTH build outs, in some embodiments the terminal may be configured to accept the "hand-off" of fiber and distribute up to 24 service drops. A route path may be aerially established to the subscriber with microducts or Flat-SC drop connect. In one embodiment using the microduct solution, a pre-terminated pushable drop cable, terminated with a pushable connector on one end and industry standard connector on the other, may be pushed or pulled from or to the terminal, mated and secured with an industry standard SC connector.

Various embodiments of terminals disclosed herein provide flexible and hardened terminals. Various embodiments are configured to support various different types of drops and microducts, including those supplied by Clearfield. The configuration flexibility supports multitude of application environments. Various embodiments may provide plug-and-play readiness, and may flex and scale to meet the requirement foundation for any network design.

Embodiments of aerial terminals may be configured to allow for mid-spanning up to a 144-count optical fiber for fiber connectivity with up to 24 drops from the terminal to the subscriber. Without commanding a price premium over a simple splice case that has often been used to provide the splicing and connectivity required for this application, aerial terminals also provide interconnect connectivity. In addition, the aerial terminal may provide the service provider a choice of drop cable media.

An aerial terminal allows for aerial/strand mount fiber deployment within the network architecture. Designed for easy craft accessibility, embodiments of an aerial terminal may have a removable hinged cover with four side entrance cable access ports. Some embodiments of aerial terminal may have 24 individual drops terminated to SC connectors. Various embodiments of the aerial terminal may be configured to accept various drop options, for example all of the FieldShield drop options, as well as other cable drop options.

Various embodiments of aerial terminals may be optimized for use with FieldShield Microduct and Pushable Fiber, as well as FieldShield flat drop cable assemblies. Free breathing aerial terminals provide durability and protection in the OSP environments.

The terminals may be configured to allow various applications. In one embodiment, the terminal may be configured for daisy chained applications. This configuration provides terminal and drop connectivity while providing signal advancement to the next terminal. In various embodiments, the terminals may be configured to support MPO, SC and LC connectors. Terminals may also be configured for coarse and dense wave division multiplexing. In some embodiments, terminals may be configured for distributed split applications, and may include different types of splitters, such as 1×4, 1×8, 1×16 PLC splitters, and may be arranged in stub configurations.

Accordingly, as described herein, various embodiments of terminals disclosed herein may be reconfigurable and expandable. For example, terminals may be configured to allow adding optical components, splitters, or CWDM. Terminals may feature hot swappable modules and feature plug and play functionality.

Various embodiments of the terminals disclosed herein are complaint with Telcordia GR-771. The terminal may be constructed of black UV resistant thermoplastic. The terminal may be constructed of other materials, preferably a corrosion-resistant material. The terminal may can be constructed to be breathable and durable in OSP environments.

Various patch and splice configurations of the terminal 300 accept flat drop and OSP cable types. Various embodiments of the invention allow for customer defined configurations to maximize scalability.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A optical fiber management cassette configured for use in a terminal, the optical fiber management cassette comprising:
   one or more splice chips, each of the one or more splice chips comprising:
      a splice chip base;
      a plurality of posts emanating from the splice chip base and arranged vertically along the splice chip base;
      a lower protrusion emanating from at least a first post of the plurality of posts and an upper protrusion emanating from at least a second post adjacent to the first post, wherein the lower protrusion is configured to bias a bottom splice towards the second post, and wherein the upper protrusion is configured to bias a top splice towards the first post; and
      chip ends at edges of the splice chip base;
   a splice tray having a plurality of undercuts configured to receive and retain the one or more splice chips by coupling the chip ends to the undercuts; and
   a base housing having mounting tabs configured to couple with at least the splice tray, wherein the splice tray is supported in the base housing.

2. The optical fiber management cassette of claim 1, wherein a plurality of lower slots are formed between the plurality of posts and a plurality of lower protrusions, and a plurality of upper slots are formed between the plurality of posts and a plurality of upper protrusions.

3. The optical fiber management cassette of claim 2, wherein the plurality of upper slots are stacked on the plurality of lower slots.

4. The optical fiber management cassette of claim 2, wherein the plurality of lower protrusions are configured to secure bottom splices in the lower slots and the upper protrusions are configured to secure top splices in the upper slots.

5. The optical fiber management cassette of claim 1, wherein the splice tray comprises a fiber routing area and a management area.

6. The optical fiber management cassette of claim 1, further comprising an adapter plate removably connected to the base housing, wherein the adapter plate is configured to accept a plurality of optical fiber connectors or adapters.

7. The optical fiber management cassette of claim 1, wherein the one or more splice chips are coupled to the splice tray by bending the one or more splice chips so that the chip ends couple with the undercuts.

8. The optical fiber management cassette of claim 7, wherein the chip ends are inserted below the undercuts to retain the one or more splice chips to the splice tray.

9. The optical fiber management cassette of claim 1, further comprising a splice tray cover connected to the splice tray.

10. The optical fiber management cassette of claim 1, further comprising a top cover connected to the base housing.

11. The optical fiber management cassette of claim 1, further comprising a splice tray cover connected to the splice tray.

12. The optical fiber management cassette of claim 1, further comprising a slack storage cover coupled to the base housing and defining a slack storage area between the slack storage cover and the base housing.

13. The optical fiber management cassette of claim 1, wherein the base housing comprises mounting tabs configured to mount the optical fiber management cassette to a terminal.

14. The optical fiber management cassette of claim 1, wherein the optical fiber management cassette is configured for terminating optical fiber at a terminal.

15. The optical fiber management cassette of claim 1, wherein the one or more splice chips are stackable loose fiber splice chips.

16. A method of assembling an optical fiber management cassette, comprising:
   providing a splice chip, the splice chip comprising:
      a splice chip base;
      a plurality of posts emanating from the splice chip base and arranged vertically along the splice chip base;
      a lower protrusion emanating from at least a first post of the plurality of posts and an upper protrusion emanating from at least a second post adjacent to the first post, wherein the lower protrusion is configured to bias a bottom splice towards the second post, and wherein the upper protrusion is configured to bias a top splice towards the first post; and
      chip ends at edges of the splice chip base;

providing a splice tray having a plurality of undercuts configured to receive and retain the splice chip; and coupling the splice chip to the splice tray.

17. The method of claim 16, wherein coupling the splice chip to the splice tray comprises coupling the chip ends to the undercuts.

18. The method of claim 16, wherein coupling the splice chip to the splice tray comprises by bending the splice chip so that the chip ends couple with the undercuts.

19. The method of claim 16, wherein coupling the splice chip to the splice tray comprises inserting chip ends below the undercuts to retain the splice chip to the splice tray.

* * * * *